United States Patent [19]
Murai

[11] 3,824,618

[45] July 16, 1974

[54] MAGNETIC HEAD AND SIMULATED FOUR-CHANNEL STEREO SYSTEM

[75] Inventor: Masayuki Murai, Tokyo, Japan

[73] Assignee: Pioneer Electronics Corporation, Tokyo, Japan

[22] Filed: Oct. 10, 1972

[21] Appl. No.: 296,491

[30] Foreign Application Priority Data

Oct. 7, 1971 Japan .......................... 46-92328[U]
Oct. 13, 1971 Japan .......................... 46-94482[U]

[52] U.S. Cl. ................ 360/22, 179/1 GQ, 360/121, 360/123

[51] Int. Cl. .......................... G11b 5/20, G11b 5/28

[58] Field of Search ........... 179/100.2 C, 100.2 RE, 179/100.1 TD, 100.2 MD, 1 GQ; 340/174.1 F; 346/74 MC

[56] References Cited

UNITED STATES PATENTS

| | | | |
|---|---|---|---|
| 2,767,254 | 10/1966 | Lafferty | 179/100.2 RE |
| 3,047,674 | 7/1962 | Keksinen | 179/100.2 C |
| 3,502,795 | 3/1970 | Camras | 179/100.2 MD |
| 3,632,886 | 1/1972 | Scheiber | 179/1 GQ |
| 3,665,429 | 5/1972 | Thornly | 340/174.1 B |
| 3,688,054 | 8/1972 | Suzuki | 179/100.2 RE |
| 3,708,631 | 1/1973 | Bauer et al. | 179/100.1 TD |

*Primary Examiner*—Alfred H. Eddleman
*Attorney, Agent, or Firm*—Sughrue, Rothwell, Mion, Zinn & Macpeak

[57] ABSTRACT

A magnetic reproducing head for reproducing a two-channel stereo signal as a simulated four-channel signal. The head reproduces the first channel signal, the second channel signal, a signal equal to the difference between the first and second channel signals and the difference between the second and first channel signals.

4 Claims, 3 Drawing Figures

MAGNETIC HEAD AND SIMULATED FOUR-CHANNEL STEREO SYSTEM

BACKGROUND OF THE INVENTION

Field of the Invention

The present invention relates to a magnetic head for reproducing, for example, a two-channel stereo signal as a simulated four-channel stereo signal.

The object of the present invention is to provide a magnetic head, which itself generates difference signals of a two-channel signal, and is so improved that it can obtain easily a simulated four-channel signal utilizing the difference signals.

DESCRIPTION OF THE PREFERRED EMBODIMENT

Figure 1:
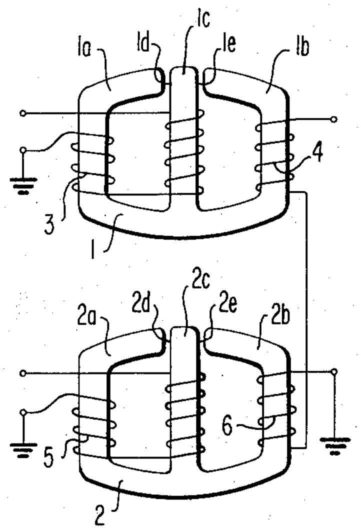
FIG. 1 is a plan view showing a magnetic head according to the present invention.

In FIG. 1, the numerals 1 and 2 designate a first and a second core, respectively. These cores 1 and 2 constitute a single magnetic head in a mutually superposed state, but for clarity, they are shown developed on the same single plane in FIG. 1.

The first core 1, for reproducing a signal recorded in the first channel of a magnetic tape, comprises a first portion 1*a* and a second portion 1*b* which are spaced mutually at an appropriate interval, and a third portion 1*c* situated therebetween. A first gap 1*d* is formed between the first portion 1*a* and the third portion 1*c*, and a second gap 1*e* is formed between the second portion 1*b* and the third portion 1*c*, respectively. A first coil 3 is wound around the first portion 1*a* and the third portion 1*c*, such that an electric signal is produced corresponding to the magnetic signal at the first gap 1*d* recorded in the first channel of the magnetic tape. Further, a second coil 4 is wound on the second portion 1*b*, such that the signal of the first channel of the tape is generated at the second gap 1*e*.

The second core 2 serves to reproduce a signal recorded in the second channel of the magnetic tape, and comprises, as in the case of the first core 1, a first portion 2*a*, a second portion 2*b*, a third portion 2*c*, a first gap 2*d* and a second gap 2*e*. A third coil 5 is wound around the first and the third portions 2*a* and 2*c*, and a fourth coil 6 is wound around second portion 2*b*.

The second coil 4 wound on the second portion 1*b* of the first core 1, and the fourth coil 6 wound on the second portion 2*b* of the second core 2 are so connected that they are in a reverse phase relation with each other; thus a difference signal of the signals generated in both coils 4 and 6 is produced between a terminal of coil 4 and a terminal of coil 6.

Figure 2:
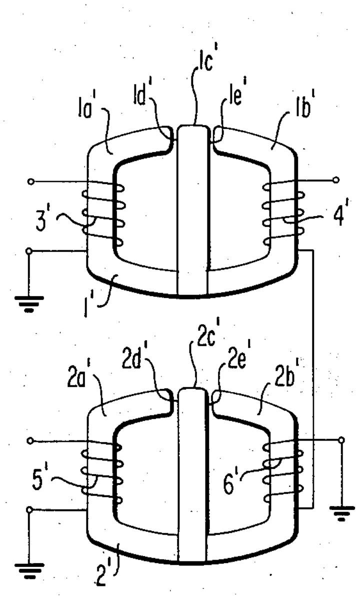
FIG. 2 is a plan view showing an alternate embodiment of a magnetic head according to the present invention.

In FIG. 2, the numerals 1' and 2' designate a first and a second core, respectively. These cores 1' and 2' constitute a single magnetic head in a mutually superposed state, but for clarity, they are shown developed on the same single plane in FIG. 2.

The first core 1', for reproducing a signal recorded in the first channel of a magnetic tape, comprises a first portion 1*a'* and a second portion 1*b'* which are spaced mutually at an appropriate interval, and a third portion 1*c'* situated therebetween. A first gap 1*d'* is formed between the first portion 1*a'* and the third portion 1*c'*, and a second gap 1*e'* is formed between the second portion 1*b'* and the third portion 1*c'*, respectively. A first coil 3' is wound around the first portion 1*a'* such that an electric signal is produced corresponding to the magnetic signal at the first gap 1*d'* recorded in the first channel of the magnetic tape. Further, a second coil 4' is wound on the second portion 1*b'*, such that the signal of the first channel of the tape is generated at the second gap 1*e'*.

The second core 2' serves to reproduce a signal recorded in the second channel of the magnetic tape, and comprises, as in the case of the first core 1', a first portion 2*a'*, a second portion 2*b'*, a third portion 2*c'*, a first gap 2*d'* and a second gap 2*e'*. A third coil 5' is wound around the first portion 2*a'* and a fourth coil 6' is wound around second portion 2*b'*.

The second coil 4' wound on the second portion 1*b'* of the first core 1', and the fourth coil 6' wound on the second portion 2*b'* of the second core 2' are so connected that they are in a reverse phase relation with each other, thus a difference signal of the signals generated in both coils 4' and 6' is produced between a terminal of coil 4' and a terminal of coil 6'.

Figure 3:
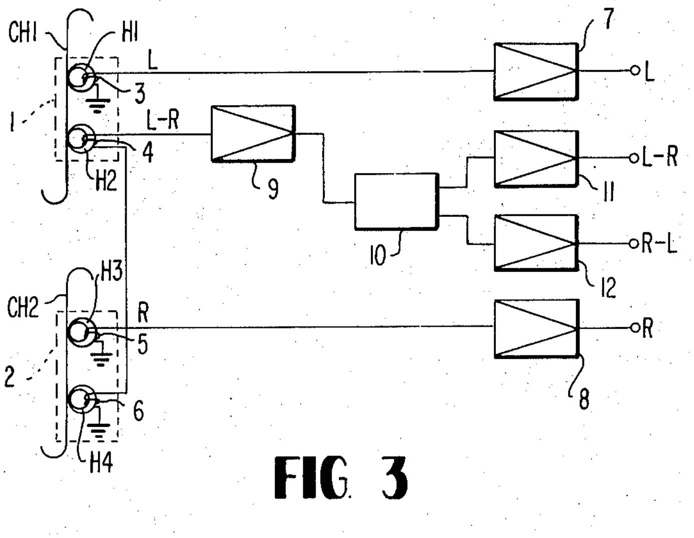
FIG. 3 is an electric schematic diagram showing an example of the magnetic head in use.

Referring to FIG. 3, the operation of the heads shown in FIGS. 1 and 2 will be described. For the sake of clarity the numerals corresponding to FIG. 1 will be used; however, the corresponding elements designated by a prime in FIG. 2 could also be used.

In operation, the first and the second cores 1 and 2 are each provided with the first gap 1*d*, 2*d* and the second gaps 1*e*, 2*e* which are spaced in the direction of the magnetic tape to be reproduced so that, with respect to the first channel CH1 of the magnetic tape, a first head H1 corresponding to the first gap 1*d* and the second head H2 corresponding to the second gap 1*e* are provided in parallel at a predetermined distance apart (this corresponds to the width of the third portion 1*c*) in a direction of movement of the magnetic tape. Similarly, with regard to the second channel CH2, the third head H3 and the fourth head H4 are considered to be provided in parallel. The coil 3 of the first head H1 is connected to a first amplifier 7, and the coil 5 of the third head H3 is connected to a second amplifier 8. Assuming that, for example, the left channel signal L of a stereo signal has been recorded in the first channel CH1, and the right channel signal R in the second channel CH2, then the first amplifier 7 is connected to the left main speaker, and the second amplifier 8 is connected to the right main speaker, respectively; thus the reproduction of the stereo signals is effected.

The coil 4 of the second head H2 and the coil 6 of the fourth head H4, which are connected to be in reverse phase with each other, generate a difference signal L-R between a left signal L recorded in the first channel CH1 and a right signal R of the second channel CH2 at a time slightly lagging (this corresponds to a time required for a particular point on the magnetic tape to pass between the first gap 1*d* and the second gap 1*e*) behind the first and the second heads H1 and H2. This difference signal L-R, after being amplified by an amplifier 9, is converted into two difference signals L-R and R-L by means of a phase inverting circuit 10, the one is fed to a left (or right) sub-speaker through an amplifier 11, the other to a right (or left) sub-speaker through an amplifier 12, respectively.

It is well known that an artificial four-channel effect can be obtained by reproducing these difference signals L-R and R-L. Since the difference signals L-R and R-L are reproduced at a predetermined time behind the signals L and R, the conventional two-channel stereo signals, which have been recorded in the first and the second channels CH1 and CH2, are reproduced accompanied by a reverberant effect, echo effect, etc.; thus, an extremely favorable and natural sound field can be reproduced.

While the invention has been particularly shown and described with reference to the preferred embodiment thereof, it will be understood by those skilled in the art that various changes in form and details may be made therein without departing from the spirit and scope of the invention.

I claim:

1. A magnetic reproducing head and system for reproducing from a magnetic tape a two-channel stereo signal as a simulated four-channel stereo signal, said head comprising:

a. first core means for reproducing a first signal recorded in a first channel of said magnetic tape, said first core means comprising at least a first and a second portion forming at least one gap therebetween, and a first coil wound around said first portion of said first core means;

b. second core means for reproducing a second signal recorded in a second channel of said magnetic tape, said second core means comprising at least a first portion and a second portion forming at least one gap therebetween, and a second coil wound around said first portion of said second core means; and c. difference means connected to said first and second core means for directly producing at least one difference signal equal to the difference between said first signal and said second signal, said difference means comprising a third coil wound around the second portion of said first core means and a fourth coil wound around the second portion of said second core means, said third and fourth coils being connected in a reversed phase series circuit such that the signals induced in said third and fourth coils are subtractive to produce a first difference signal across said series circuit.

2. A magnetic reproducing head and system as set forth in cliam 1 wherein said difference means further includes an inverter connected to the output of said series circuit to invert said first difference signal to produce a second difference signal.

3. A magnetic reproducing head as set forth in claim 1 wherein said first core means further comprises a third portion positioned between said first and second portions wherein a first gap is formed between said first and third portions and a second gap is formed between said second and third portions, and wherein said second core means further comprises a third portion positioned between said first and second portions wherein a first gap is formed between said first and third portions and a second gap is formed between said second and third portions whereby said difference signal is delayed by said magnetic reproducing head with respect to said first and second signals thereby producing a reverberating effect.

4. A magnetic reproducing head as set forth in claim 3 wherein said first coil is additionally wound around said third portion of said first core means and said second coil is additionally wound around said third portion of said second core means.

* * * * *